(12) United States Patent
Michelsen

(10) Patent No.: US 12,263,474 B2
(45) Date of Patent: Apr. 1, 2025

(54) FLUIDIZED BED REACTOR APPARATUS AND A METHOD FOR PROCESSING ORGANIC MATERIAL USING A FLUIDIZED BED REACTOR APPARATUS

(71) Applicant: Thermtech Holding AS, Paradis (NO)

(72) Inventor: Erik Michelsen, Fana (NO)

(73) Assignee: Thermtech Holding AS, Paradis (NO)

( * ) Notice: Subject to any disclaimer, the term of this patent is extended or adjusted under 35 U.S.C. 154(b) by 489 days.

(21) Appl. No.: 17/441,212

(22) PCT Filed: Apr. 7, 2020

(86) PCT No.: PCT/NO2020/050098
§ 371 (c)(1),
(2) Date: Sep. 20, 2021

(87) PCT Pub. No.: WO2020/209729
PCT Pub. Date: Oct. 15, 2020

(65) Prior Publication Data
US 2022/0152569 A1    May 19, 2022

(30) Foreign Application Priority Data

Apr. 8, 2019   (NO) .................................. 20190476

(51) Int. Cl.
*B01J 8/10*    (2006.01)
*B01J 8/00*    (2006.01)
(Continued)

(52) U.S. Cl.
CPC ............ *B01J 8/382* (2013.01); *B01J 8/0045* (2013.01); *B01J 8/005* (2013.01); *B01J 8/082* (2013.01);
(Continued)

(58) Field of Classification Search
None
See application file for complete search history.

(56) References Cited

U.S. PATENT DOCUMENTS 2,419,088 A * 4/1947 Putney ...................... B01J 8/10
    208/158
3,039,779 A * 6/1962 Laird ...................... F16J 15/40
    277/431
(Continued)

FOREIGN PATENT DOCUMENTS

DE       1298871        9/1969
GB       2525097 A      10/2015
(Continued)

OTHER PUBLICATIONS

Norwegian Search Report, Application No. NO20190476, Date of Report: Oct. 30, 2019.

(Continued)

*Primary Examiner* — Jennifer A Leung
(74) *Attorney, Agent, or Firm* — Flener IP & Business Law; Zareefa B. Flener

(57) ABSTRACT

Fluidized bed reactor apparatus, comprising a cylindrical reactor chamber (10), and a rotating shaft (14) equipped with radially extending fluidization units (16) disposed in the reactor chamber (10), said rotating shaft (14) being connected to a drive unit (42). The apparatus further comprising means for feeding fluidizing bed material into the reactor chamber (10), creating a fluidized bed (28) in the reactor chamber (10), means for feeding organic material that shall be processed into the fluidized bed (28) in the reactor chamber (10), and one or more outlets (22,24) for discharge of material, gases and vapors, wherein the process in the reactor chamber (10) is controlled by a control system (40) connected to at least the drive unit (42). The invention also (Continued)

relates to a method for processing organic material using a fluidized bed reactor apparatus.

6 Claims, 1 Drawing Sheet

(51) Int. Cl.
| | | |
|---|---|---|
| *B01J 8/08* | (2006.01) | |
| *B01J 8/18* | (2006.01) | |
| *B01J 8/36* | (2006.01) | |
| *B01J 8/38* | (2006.01) | |
| *C10B 47/22* | (2006.01) | |
| *C10B 47/44* | (2006.01) | |
| *C10B 53/07* | (2006.01) | |
| *C10G 1/10* | (2006.01) | |
| *C10K 1/02* | (2006.01) | |

(52) U.S. Cl.
CPC ............... *B01J 8/10* (2013.01); *B01J 8/1809* (2013.01); *B01J 8/1818* (2013.01); *B01J 8/36* (2013.01); *C10B 47/22* (2013.01); *C10B 47/44* (2013.01); *C10B 53/07* (2013.01); *C10G 1/10* (2013.01); *C10K 1/02* (2013.01); *B01J 2208/00044* (2013.01); *B01J 2208/0007* (2013.01); *B01J 2208/00557* (2013.01); *B01J 2208/00769* (2013.01)

(56) References Cited

U.S. PATENT DOCUMENTS

| | | | | |
|---|---|---|---|---|
| 4,655,146 A | * | 4/1987 | Lemelson | ............... C21B 13/08 |
| | | | | 431/114 |
| 8,304,590 B2 | * | 11/2012 | Hopkins | ................. F26B 17/20 |
| | | | | 202/262 |
| 8,323,369 B2 | * | 12/2012 | Robertson | ............... C10B 47/44 |
| | | | | 202/133 |
| 2011/0212015 A1 | | 9/2011 | Krishnan | |

FOREIGN PATENT DOCUMENTS

| | | |
|---|---|---|
| JP | 5916430 B2 | 5/2016 |
| WO | 9608544 A1 | 3/1996 |

OTHER PUBLICATIONS

Norwegian Patent Office Office action for NO20190476 (no translation available), Oct. 30, 2019.
PCT International Search Report for PCT/NO2020/050098, mailed Jun. 29, 2020.
Written Opinion of the International Searching Authority for PCT/NO2020/050098, mailed Jun. 29, 2020.
PCT International Preliminary Report on Patentability for PCT/NO2020/050098, mailed Aug. 18, 2021.

* cited by examiner

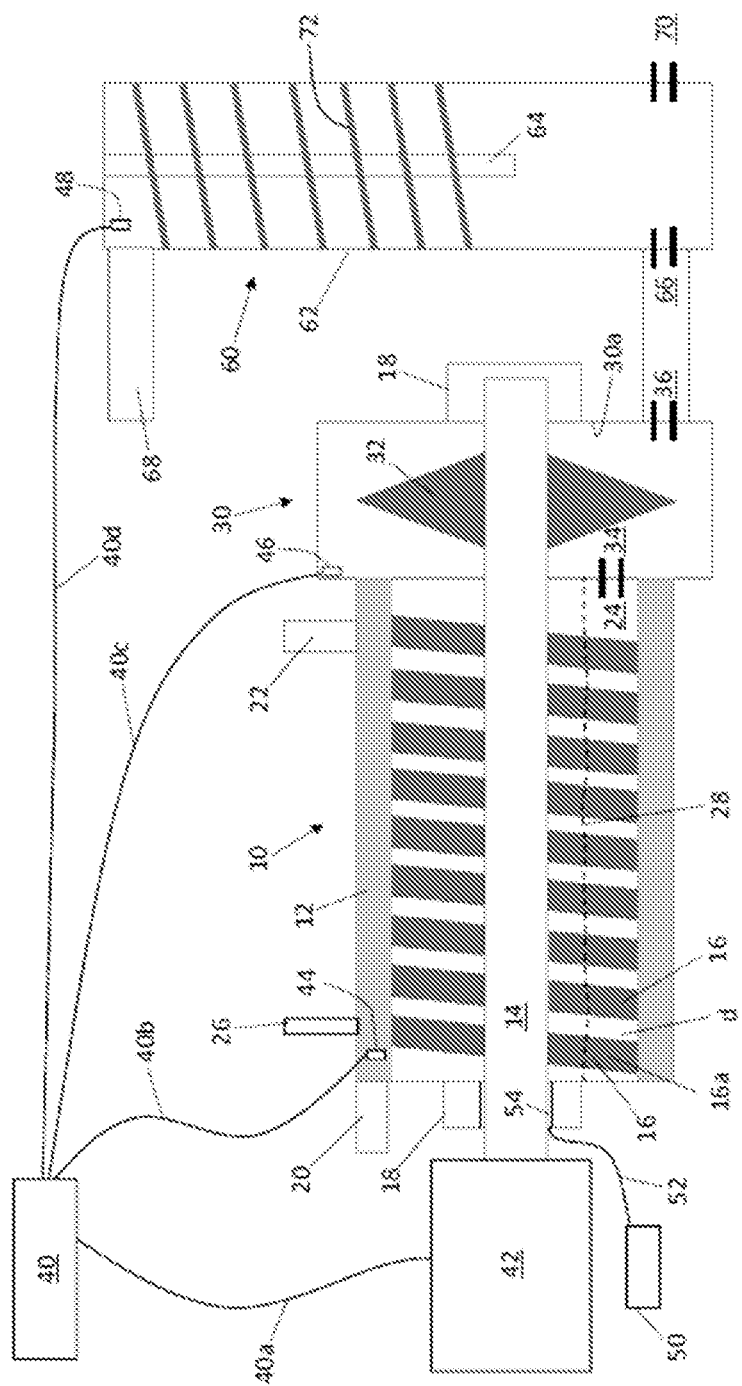

FLUIDIZED BED REACTOR APPARATUS AND A METHOD FOR PROCESSING ORGANIC MATERIAL USING A FLUIDIZED BED REACTOR APPARATUS

FIELD OF THE INVENTION

The present invention relates to a fluidized bed reactor apparatus, comprising a cylindrical reactor chamber, and a rotating shaft equipped with radially extending blades disposed in the reactor chamber, said rotating shaft being connected to a drive unit. The invention also relates to a method for processing organic material using a fluidized bed reactor apparatus, and use of such an apparatus.

DISCLOSURE OF THE STATE OF ART

Fluidized bed has been used for a long time to support different processes requiring access to a surface area.
Pyrolysis:
  Spray pyrolysis. Spray pyrolysis is a process in which a precursor solution is atomized in a droplet generating apparatus, evaporated in a heated reactor, and then decomposed into particles and films.
  Reactor chambers with no oxygen heated by external source has been used for a long time for making diesel from rubber tires. The reactors have a big volume and footprint and require a lot of energy.
Fischer-Tropsch Process:
  Multi tubular fixed-bed reactor
  Entrained flow reactor
  Slurry reactors
  Fluid-bed and circulating catalyst (riser) reactors
Friedrich Bergius Process:
  A technique for the high-pressure and high-temperature chemistry of carbon-containing substrates yielded
Gasification:
  Counter-current fixed bed
  Co-current fixed bed
  Fluidized bed reactor
  Entrained flow gasifier
  Plasma gasifier
Combustion:
  Fluidized bed combustion
  Grate firing
  Pulverized fuel firing
Heat Exchanging:
  Plate heat exchangers
  Tube and shell heat exchanger
  Fluidized bed heat exchanger FBHX
Catalytic Chemical Processes:
  Fluidized bed catalytic chemical vapour deposition synthesis of carbon nanotubes Fluid Catalytic Cracking (FCC) process
  All the processes above utilize in some sort of form an equipment that makes a fluidized bed available. Due to the different process requirements, the equipment making the fluidized bed is adapted.
A Standard Fluidized Bed Reactor Today:
  The solid substrate (the catalytic material upon which chemical species react) material in the fluidized bed reactor is typically supported by a porous plate, known as a distributor. The fluid is then forced through the distributor up through the solid material. At lower fluid velocities, the solids remain in place as the fluid passes through the voids in the material. This is known as a packed bed reactor. As the fluid velocity is increased, the reactor will reach a stage where the force of the fluid on the solids is enough to balance the weight of the solid material. This stage is known as incipient fluidization and occurs at this minimum fluidization velocity. Once this minimum velocity is surpassed, the contents of the reactor bed begin to expand and swirl around much like an agitated tank or boiling pot of water. The reactor is now a fluidized bed. Depending on the operating conditions and properties of solid phase various flow regimes can be observed in this reactor. Source: Wikipedia.
Circulating Fluidized Bed:
  Circulating fluidized bed is a relatively new technology with the ability to achieve lower emission of pollutants. Extensive research has been conducted on this technology within the past 15 years due to increasing concerns over pollution caused by traditional methods of combusting coal and its sustainability. The importance of this technology has grown recently because of tightened environmental regulations for pollutant emission.
  The Mercury and Air Toxic Standards (MATS) enacted in December 2011 by the EPA have forced all the countries in Europe and America to strictly adhere to this policy. This means that emissions such as metals, acid gases, organic compound, flue gas acids and other pollutants from power plants or industrial facilities must meet the requirements set by EPA and upgrades must be done for facilities that do not meet the standards. As a result, the demand for circulating fluidized bed technology is predicted to skyrocket.
  In 1923, Winkler's coal gasifier represented the first significant large-scale industrial application of fluidized bed (Kunii and Levenspiel, 1991). CFB combustion technology continues to grow strongly in large utility power plant applications as CFB boiler technology has grown from small-scale industrial applications to large ultrasupercritical power plants in less than 20 years. Prime examples, both provided by Sumitomo SHI FW are the 460 MW supercritical CFB power plant operating since 2009 in Lagisza, Poland, and 2200 MW ultrasupercritical Samcheok (Korea) Green Power Plant successfully running since 2016.
  Even though the cheap liquid and gaseous fuels have decelerated the coal and solid fuels R&D; many sectors increasingly use CFB viz. electricity generation and industrial sectors, because of the CFB's advantages. The 1970s crisis reactivated the interest to the solid fuel and coal again. Moreover, the increasing concern of GHGs, cheap cost of coal and its abundant sources motivate again the researches of CFB (IEA-CIAB, 2013). The CCS was considered as an important technology to mitigate GHGs. To apply CCS, novel techniques viz. pre-combustion, post-combustion, and oxy-combustion are raised. Subsequently, the R&D are undertaken for understanding the effects of new operation conditions like using gaseous mixture comparing with conventional units. This chapter is dedicated toward the detailed review of literature in the fields of CFB's hydrodynamic behaviour, oxy-fuel combustion and generations of oxy-fuel combustion. It also discusses the literature on lower or zero carbon energy sources (biofuel). The special focus on the biofuel usage for CFB is to service lower or zero carbon energy technology. Source: Wikipedia.
  WO9608544 A1 discloses a method for thermo-mechanical cracking and hydrogenation of chemical substances such as hydrocarbons in liquid or solid form, waxes, carbonates, lime, oil-shale, oil-sand, oily residue from refineries and crude tank bottoms, plastic and the like. The cracking and the hydrogenating of the substances in the presence of hydrogen releasing chemicals as water is performed in a mechanical established fluidized bed of fine grained solids where the mechanical action in the fluidized bed generates the heat participating in the cracking in addition to the mechanical action to the substances whereby the cracking in the cavitating micro bubbles and the hydrogenation takes place in the reactor with an overall temperature and pressure lower than by conventional cracking and/or hydrogenation processes.

Reference is also made to the following patent documents: US20140073822A1—Rotating fluidized bed catalytic pyrolysis reactor, U.S. Pat. No. 5,374,405A—Rotating fluidized bed reactor with electromagnetic radiation source; U.S. Pat. No. 4,277,938A—Combination rotating fluidized bed combustor and heat exchanger; US20090098263A1—Device and method for rotary fluidized bed in a succession of cylindrical chambers; U.S. Pat. No. 6,779,492B2—Circulating fluidized bed reactor device; U.S. Pat. No. 6,923,128B2—Circulating fluidized bed reactor; and U.S. Pat. No. 6,631,698B1—Circulating fluidized bed reactor.

OBJECTS OF THE PRESENT INVENTION

The availability of a fluidized bed with extreme surface area in a limited volume can be used for the following applications:
Pyrolysis
Fischer-Tropsch process
Friedrich Bergius process
Gasification
Combustion
Heat exchanging
Catalytic chemical processes It is an object to provide a process and an apparatus with the ability to create and adjust a fluidized bed without vibration or injection of gasses. The fluidized bed, and related surface area, is made in a very limited volume compared to existing technologies. The availability of an extreme surface area in a reduced volume enable multiple processes that normally needs a high retention time to be completed with a low retention time.

With the invention, it is possible to obtain: A fluidized bed reactor with rotating fluidized bed. A fluidized bed reactor with adjustable bed density and thickness. A fluidized bed reactor including a mechanical solids separation. A fluidized bed reactor including a gas and/or vapour polishing system. A fluidized bed reactor including a solution for seals flushing to prevent damage of the bearings. A fluidized bed reactor including heat control. A fluidized bed reactor flexible for multiple processes. A fluidized bed reactor enabling lower retention time due to high-fluidized bed density.

SUMMARY OF THE INVENTION

Some or all of the above objects are obtained by a fluidized bed reactor apparatus, comprising a cylindrical reactor chamber with a rotating shaft equipped with radially extending fluidization blades disposed in the reactor chamber, said rotating shaft being connected to a drive unit, one or more inlets for feeding fluidizing bed material into the reactor chamber, creating a fluidized bed in the reactor chamber, and for feeding organic material that shall be processed into the fluidized bed in the reactor chamber, and one or more outlets for discharge of material, gases and/or vapours from the reactor chamber. A separator chamber is connected to the rotating shaft of the reactor chamber, said separator chamber being an apparatus for mechanical separation of dust particles in the gas and/or vapour stream received from the reactor chamber, and which comprises one or more separation blades rotating around an axis, mechanically separating dust particles from the gas and/or vapour stream, and a control system is connected to the drive unit driving the rotating shaft, said control system being connected to sensors in the reactor chamber and/or separator chamber.

The fluidized bed reactor apparatus may comprise means for feeding catalytic material into the fluidized bed in the reactor chamber.

The fluidized bed reactor apparatus comprises a polishing chamber connected to the separator chamber, said polishing chamber being an apparatus for removing particles from the gas and/or vapour stream received from the separator chamber.

The polishing chamber comprises a housing with an internal screw forcing the gas and/or the vapour to follow the screw trajectory, and means for circulating a cleansing fluid over surfaces in the polishing chamber.

The polishing chamber can further comprise one or more outlets for polished gas and/or vapour, and one or more outlets for recovered particles.

The fluidized bed reactor apparatus comprises one or more sealing and supporting bearings, said bearings having inert gas flushing.

The control system of the fluidized bed reactor apparatus can be adapted to control the process in the reactor chamber based on said sensors reading input values, such as: rpm of the rotating shaft, temperature in the reactor chamber, height of the fluidized bed represented by the load of the drive unit, speed of material fed into the reactor chamber, speed of material and gas and/or vapor discharged out of the reactor chamber, pressure in the reactor chamber, inert gas flushing flow to the bearing on the reactor chamber, and cooling flow to the reactor chamber.

The control system of the fluidized bed reactor apparatus can be adapted to control the process in the separator chamber based on said sensors reading at least one or more of the following input values: rpm of the separator units in the separator chamber, temperature in the separator chamber, and pressure in the separator chamber.

The control system of the fluidized bed reactor apparatus may further be adapted to control the process in the polishing chamber based on one or more sensors reading at least one or more of the following input values: temperature in the polishing chamber, flow of cleansing fluid in the polishing chamber, viscosity of cleansing fluid represented by pressure in the polishing chamber, and level of cleansing fluid in the polishing chamber.

The above objects are also achieved with a method for processing organic material using a fluidized bed reactor apparatus, the method comprising the steps:
feeding in fluidized bed material chosen as required by the process,
adjusting the rpm for the rotating shaft in the reactor chamber to correct density of the fluidized bed,
controlling the height of the fluidized bed by adding more fluidized bed material or discharging fluidized bed material,
feeding material which shall be processed into the established fluidized bed,
controlling retention time in the reactor chamber by balancing feeding of new material and discharging treated material,
guiding gas and/or vapour stream from the reactor chamber to a mechanical separation chamber, and
mechanical dust separation of particles from the gas and/or vapour stream in the mechanical separation chamber.

The method may further comprise
guiding the gas and/or vapour steam from the mechanical separation chamber to a polishing chamber,
polishing the gas and/or vapour stream by removing additional particles, and
guiding the polished gas and/or vapour stream to a gas or vapour treatment plant suitable for further processing.

According to the method, catalyst material can be fed into the fluidized bed through a separate inlet or together with the material that shall be processed.

Solid particles can be discharged from the polishing chamber when the pressure in a circulation line of cleansing fluid in the polishing chamber is high.

The height of the fluidized bed in the reactor chamber can be controlled by reading the load on the drive unit and adjusting the output value to the discharge from the reactor chamber.

The temperature in the reactor chamber can be controlled by feeding of more material or by controlling cooling of the reactor chamber.

The temperature in the polishing chamber can be controlled by cooling or heating the cleansing fluid.

According to the method, the process can comprise production of diesel by feeding organic material into the reactor chamber, and heating up to an organic conversion temperature, without the participation of oxygen, where the organic material is converted to diesel by a pyrolysis process.

According to the method, the process can comprise production of diesel by feeding plastic material into the reactor chamber, and heating up to an organic conversion temperature, without the participation of oxygen, where the organic material is converted to diesel by a pyrolysis process.

According to the method, the process can comprise production of diesel by feeding dried sewage sludge into the reactor chamber, and heating up to an organic conversion temperature, without the participation of oxygen, where the organic material is converted to diesel by a pyrolysis process.

According to the method, the process can comprise production of diesel by feeding brown coal into the reactor chamber, and heating up to a temperature, without the participation of oxygen, where the organic material is converted to diesel by a pyrolysis process.

The invention also relates to use of a fluidized bed reactor apparatus as a heat exchanger, wherein rotation of the rotor blades in the reactor chamber creates friction with the solids of the feed, combined with friction between the solid particles themselves, for production of heat.

Produced heat can be used to evaporate volatile components of the feed and/or to heat the solids in the reactor chamber. Produced heat may also be transferred to another process or application.

Heating rate and temperature in the reactor chamber can at least be controlled by the rotor speed (rpm), solid particles quantity inside the reactor and volatile material as well as the material characteristics of the feed inside the reactor apparatus.

DESCRIPTION OF THE FIGURE

Embodiments of the present invention will now be described, by way of example only, with reference to the enclosed FIG. 1 showing a schematic of a fluidized bed reactor apparatus according to the invention.

DESCRIPTION OF PREFERRED EMBODIMENTS OF THE INVENTION

The enclosed schematic shows an example of a fluidized bed reactor apparatus according to the invention, but without all the details that are not necessary to explain the invention to a skilled person.

The apparatus is preferably divided into three chambers 10,30,60, which can be combined or made as separate components. The first chamber 10, also called the reactor or reactor chamber, is an apparatus where the fluidized bed 28 is created and controlled. Height of the fluidized bed 28 is represented by the dotted line. The reactor chamber 10 comprises a stator 12 with a rotor shaft 14 inside. The rotating shaft 14 has fluidization units 16 on the form of one or more hammers, knives, or blades connected. The fluidization units, hereinafter called blades or rotor blades 16, are of different thickness depending on the characteristics required from the fluidized bed, and the blades can be exchanged as needed and desired. A distance d between the blades 16 can be chosen as desired. The blades 16 can be rotated around its own axis, if required, to support gas or vapour movement. An end 16a of the blades 16 can be covered with a hard-facing material to withstand the wear from the fluidized bed.

At one or both ends of the reactor chamber 10, there is preferably a bearing 18 with a seal towards the reactor chamber 10. To protect the bearing 18 towards the harsh environment in the chamber 10, a seal system with nitrogen, or other inert gasses, flushing towards the reactor can be provided. The seal system is illustrative shown as comprising an inert gas supply 50, a supply line 52 running to the bearing 18, and a seal 54 in the bearing allowing flushing of inert gas. A seal system can be provided at both bearings 18.

The reactor chamber 10 is equipped with one or more inlets 20 for feeding material, such as organic material, into the fluidized bed, and one or more inlets 26 for catalytic material, and one or more outlets 24 for discharging material from the fluidized bed. The chamber 10 further has one or more outlets 22 for gas and/or vapours.

The shaft 14 of the reactor chamber 10 is driven by a drive unit 42, such as an electrical motor, where the rpm can be adjusted. By adjusting the rpm, the thickness/height of the fluidized bed can be altered to fit the process requirements. The reactor chamber 10 can have an internal or external cooling system if required.

Said inlets 20 for feeding material and said inlets 26 for catalytic material can in one embodiment be one and the same inlet.

Retention time in the reactor chamber 10 can thus be controlled by controlling the drive unit 42 and/or feeding to and/or discharging from the reactor.

In one embodiment, the reactor chamber 10 can be designed similar as a hammer mill. A hammer mill is essentially a machine to crush, pulverize, shred, grind and reduce material to suitable sizes, and comprises rotating hammers or knives. The reactor chamber with the rotating hammers or knives can be surrounded by hammer mill screens.

In one embodiment, the reactor apparatus can be used as a heat exchanger; in such a case the friction between the rotor blades 16 and the solids of the feed as well as the friction between the solid particles themselves create heat. The created heat may be used directly to evaporate volatile components of the feed and/or to heat the solids themselves only and/or to be transferred to another process or application. The heating rate and temperature is at least controlled by the rotor speed (rpm), solid particles quantity inside the reactor and volatile material as well as the material characteristics of the feed inside the reactor.

The second chamber 30, being a separator chamber, is an apparatus designed for mechanical dust separation. Some of the particles from the fluidized bed will follow the gas and/or vapours passing out through the outlet 24. The first step of dust separation is mechanical separation using a mechanical separator with one or more separation units 32 rotating around an axis in a housing or stator. The separation units, hereinafter called plates or blades 32, can be driven by the rotation of the rotor shaft 14 from the reactor chamber 10, or with a separate drive unit. The plates 32 will mechanically separate a part of the dust from the gas and/or vapour stream. The separation chamber 30 has one or more inlets 34 for gas, vapour and particles and one or more outlets 36 for gas, vapour and particles.

The mechanical separator is preferably connected directly to the rotor shaft 14 and rotating simultaneously. The separator comprises one or more blades 32 with enough surface to crash the solid particles escaped from the reactor chamber 10 and increasing their angular velocity. By increasing the angular velocity of the particles, they are grabbed from their path towards the outlet and are guided to the chamber stator wall 30a. The solid particles will therefore be accumulated on the stator wall 30a until an amount that fell down to the bottom of the separator chamber 30. In this way the quantity of the solid particles in the gas stream of the reactor outlet decreases.

The third chamber 60, being a polishing chamber, is an apparatus for polishing the gas, vapour and particles coming from the separator chamber 30, and comprises an outer housing 62 and an internal component, which forces the gas and/or vapour to change direction and speed constantly. The change of direction and speed will cause the particles to hit surfaces inside the polishing chamber 60. The surfaces in the polishing chamber 60 is constantly cleaned by circulating fluid, such as liquid, over the surfaces. One design of the polishing chamber is a circular housing 62 with a screw 64 inside where the gas and/or vapour are forced to follow the screw trajectory. The polishing chamber 60 has one or more inlets 66 for gas and/or vapour and one or more outlets 68 for polished gas and/or vapour. The polishing chamber 60 has one or more outlets 70 for recovered particles. In this embodiment, the surfaces are surfaces 72 of the internal screw 64.

A control system 40 can be connected to the chambers 10,30,60. The control system 40 is by wires or cables 40a,40b,40c,40d connected to the drive unit 42 and sensors 44,46,48 in respective chambers. The sensors 44,46,48 are shown illustrative as one unit in each chamber 10,30,60, but the sensors can in each chamber be several sensors collecting different process parameter values and be placed anywhere in the chambers.

The sensors 44,46,48 can be any type of sensors or instruments capable of collecting or reading appropriate parameter values in respective chambers. However, as a generic term, the expression "sensor" is used.

The control system 40 may receive the following example input parameter values from the sensors 44,46,48, and be used to control processes in the reactor chamber 10, separator chamber 30 and/or the polishing chamber 60:

In the reactor chamber 10 from one or more sensors 44:
Rpm of the shaft 14
Temperature in the reactor chamber 10
Height of the fluidized bed 28 represented by the load of the drive unit 42
Speed of material fed into the reactor chamber 10
Speed of material discharged out of the reactor chamber 10
Pressure in the reactor chamber 10
Seal flushing flow to the reactor chamber 10
Speed of the discharge from fluidized bed 28
Cooling flow to the reactor chamber 10

In the separation chamber 30 from one or more sensors 46:
Rpm of the plates 32
Temperature in the separation chamber 30
Pressure in the separation chamber 30

In the polishing chamber 60 from one or more sensors:
Temperature in the polishing chamber 60
Flow of the cleansing fluid in the polishing chamber 60
Viscosity of the cleansing fluid represented by pressure in the polishing chamber 60
Level of cleansing fluid in the polishing chamber 60

The control system 40 can control the process based on the following control philosophy (not being an exhaustive list):

Reactor Chamber 10:
The height of the fluidized bed 28 is controlled by reading the load on the drive unit 42 and adjusting the output value to the discharge.

The density of the fluidized bed 28 is controlled by adjusting the rpm of the shaft 14.

The temperature in the reactor chamber 10 is controlled by feeding of more material or by controlling cooling of the reactor chamber 10.

Separation Chamber 30:
The rpm of the mechanical separator is controlled by adjusting the rpm of the drive unit, i.e. drive unit 42 if connected to the same shaft 14.

Polishing Chamber 60:
The temperature in the polishing chamber 60 is controlled by cooling or heating the cleansing fluid.

The rate of cleansing is controlled by adjusting the flow of the cleansing fluid.

The discharge of recovered particles is controlled by reading the pressure of the cleansing fluid circulation line and discharging particle.

When the level of cleansing fluid is low, more cleansing fluid is added to the polishing chamber 60.

A typical process may comprise any of the following steps:

Feeding in the fluidized bed material chosen as required by the process.

This will form a circular fluidized bed 28 on the inside wall of the reactor chamber 10.

Adjusting the rpm for the shaft 14 in the reactor chamber 10 to the correct density of the fluidized bed 28.

Control the height of the fluidized bed 28 by adding more fluidized bed material or discharging fluidized bed material.

At this stage, the rotation of the mechanical particle separator is started in the separator chamber 30.

At this stage, the circulation of the cleansing fluid in the polishing chamber 60 is started.

Now the material, which shall be processed in the fluidized bed, is fed into the established fluidized bed.

If the process requires a catalysator, the catalysator material is fed into the fluidized bed in a separate inlet or together with the material, which shall be processed.

The retention time is control by balancing the feeding of new material and discharge of treated material.

If the process, and the material to be processed, add material to the fluidized bed the height of the fluidized bed is controlled by the discharge device.

When the process starts to produce gases and or vapours, they are led through inlets to the separator chamber 30 where some of the particles are separated from the gas and/or or vapour stream.

The flow of gas and/or or vapours are then optionally led through outlets 36 in the separator chamber to the inlet 66 of the polishing chamber 60.

The gas and/or or vapour stream is polished by removing further particles in the polishing chamber 60.

When the pressure in the circulation line of cleansing fluid in the polishing chamber 60 is high the recovered particles is discharged.

If the level of cleansing fluid in the polishing chamber 60 is low, more cleansing fluid is added.

When the gas and/or or vapour stream is polished it is lead through the outlets 68 of the polishing chamber 60 and directed to a gas and/or or vapour treatment which is suitable for the process.

Depending on the process, the apparatus/process can be operated in both batch and continuous modes.

As catalyst material, the following material can for instance be chosen:
Alumina, Zeolites, Silica, Enzymes, Acid base catalyst, Hydroformylation, Iron, Platinum, Nickel, Silicon, Boron As fluidized bed material, the following material can for instance be chosen:
Sand, Soil, Lead, Iron, Ashes, Biological particles, Proteins As discharge device, the following components can be used, separate or several together:
Screw conveyor, Air lock valves, Rotary valve, Double knife valve installation, Pneumatic transport system, Vibrating table, Mono pump The process can be used for production of diesel by feeding organic material, plastic material, dried sewage sludge, or brown coal into the reactor chamber 10, and heating the material up to a temperature where the material is converted to diesel by a pyrolysis process. The heating is done without the participation of oxygen.

The invention claimed is:

1. A fluidized bed reactor apparatus, comprising:
  a cylindrical reactor chamber having a rotating shaft equipped with radially extending fluidization blades disposed in the reactor chamber, said rotating shaft is connected to a drive unit, one or more inlets for feeding fluidizing bed material into the reactor chamber, creating a fluidized bed in the reactor chamber, and for feeding organic material that shall be processed into the fluidized bed in the reactor chamber, and
  one or more outlets for discharge of material, gases and/or vapors from the reactor chamber, wherein the apparatus further comprises
  a mechanical separator chamber connected to the rotating shaft of the reactor chamber, said separator chamber being an apparatus for mechanical separation of dust particles in the gas and/or vapor stream received from the reactor chamber, and which comprises separation blades rotating around an axis of said rotating shaft, mechanically separating dust particles from the gas and/or vapor stream,
  a control system connected to the drive unit driving the rotating shaft, said control system being connected to sensors in the reactor chamber and in the mechanical separator chamber, and
  wherein said apparatus comprises sealing and support bearings at each end of the reactor chamber, said sealing and support bearings having inert gas flushing,
  wherein said apparatus comprises a polishing chamber connected to the mechanical separator chamber, said polishing chamber being an apparatus for removing particles in the gas and/or vapor stream received from the mechanical separator chamber, and
  said polishing chamber comprises a housing with an internal screw, forcing the gas and/or the vapor to follow the screw trajectory, and circulation means for circulating a cleansing fluid over surfaces in the polishing chamber.

2. The fluidized bed reactor apparatus according to claim 1, wherein said apparatus comprises feeding means feeding catalytic material into the fluidized bed in the reactor chamber.

3. The fluidized bed reactor apparatus according to claim 1, wherein said polishing chamber comprises one or more outlets for polished gas and/or vapor, and one or more outlets for removed particles.

4. The fluidized bed reactor apparatus according to claim 1, wherein the control system controls the process in the reactor chamber based on said sensors reading at least one of the following input values:
  rpm of the rotating shaft,
  temperature in the reactor chamber,
  height of the fluidized bed represented by the load of the drive unit,
  speed of material fed into the reactor chamber,
  speed of material; gases and/or vapors discharged out of the reactor chamber,
  pressure in the reactor chamber,
  inert gas flushing to the bearings on the reactor chamber, and
  a cooling flow to the reactor chamber.

5. The fluidized bed reactor apparatus according to claim 1, wherein the control system controls a process in the mechanical separator chamber based on said sensors reading at least one or more of the following input values:
  rpm of separation blade in the separator chamber,
  temperature in the separator chamber, and
  pressure in the separator chamber.

6. The fluidized bed reactor apparatus according to claim 1, wherein the control system controls a process in the polishing chamber based on said sensors reading at least one or more of the following input values:
  temperature in the polishing chamber,
  flow of cleansing fluid in the polishing chamber,
  viscosity of cleansing fluid represented by pressure in the polishing chamber, and level of cleansing fluid in the polishing chamber.

* * * * *